(12) United States Patent
Henderson (10) Patent No.: US 10,902,750 B2
(45) Date of Patent: Jan. 26, 2021

(54) REMOVABLE ADHESIVE LABEL CONTAINING INHERENTLY SHRINKABLE POLYMERIC FILM

(71) Applicant: Avery Dennison Corporation, Glendale, CA (US)

(72) Inventor: Kevin O. Henderson, Willoughby Hills, OH (US)

(73) Assignee: Avery Dennison Corporation, Glendale, CA (US)

( * ) Notice: Subject to any disclaimer, the term of this patent is extended or adjusted under 35 U.S.C. 154(b) by 109 days.

(21) Appl. No.: 16/105,037

(22) Filed: Aug. 20, 2018

(65) Prior Publication Data

US 2018/0357936 A1 Dec. 13, 2018

Related U.S. Application Data

(60) Division of application No. 14/694,650, filed on Apr. 23, 2015, now Pat. No. 10,157,554, which is a (Continued)

(51) Int. Cl.
*G09F 3/10* (2006.01)
*B32B 7/12* (2006.01)
(Continued)

(52) U.S. Cl.
CPC .............. *G09F 3/10* (2013.01); *B32B 7/06* (2013.01); *B32B 7/12* (2013.01); *B32B 27/08* (2013.01); *B32B 27/10* (2013.01); *B32B 27/18* (2013.01); *B32B 27/20* (2013.01); *B32B 27/281* (2013.01); *B32B 27/285* (2013.01); *B32B 27/286* (2013.01); *B32B 27/288* (2013.01); *B32B 27/302* (2013.01); *B32B 27/304* (2013.01);
(Continued)

(58) Field of Classification Search
None
See application file for complete search history.

(56) References Cited

U.S. PATENT DOCUMENTS 3,312,563 A 4/1967 Rusch
4,501,845 A 2/1985 Baus et al.
(Continued)

FOREIGN PATENT DOCUMENTS

BR PI9709104 8/1999
CN 1201475 12/1998
(Continued)

OTHER PUBLICATIONS

Overview of materials for Ethylene Vinyl Alcohol (EVOH), available at http://www.matweb.com/search/datasheet.aspx?matguid=744899e4ab06482da9cf86d8f450bd0d&ckck=1, hereafter referred to as "Matweb".
(Continued)

*Primary Examiner* — Laura C Powers (57) ABSTRACT

An adhesive label includes a polymeric first film layer that is nonoriented and has a significant inherent shrinkage when heated above ambient temperature. The label is useful in various labeling applications and especially adhesive labeling of reusable and recyclable containers which require removal of the label during a washing process in a warm or hot washing fluid.

15 Claims, 4 Drawing Sheets

Related U.S. Application Data continuation of application No. 13/262,439, filed as application No. PCT/US2010/029178 on Mar. 30, 2010, now abandoned.

(60) Provisional application No. 61/164,680, filed on Mar. 30, 2009.

(51) Int. Cl.

| | |
|---|---|
| *B32B 7/06* | (2019.01) |
| *B65D 25/20* | (2006.01) |
| *G09F 3/02* | (2006.01) |
| *B32B 27/08* | (2006.01) |
| *B32B 27/10* | (2006.01) |
| *B32B 27/18* | (2006.01) |
| *B32B 27/20* | (2006.01) |
| *B32B 27/28* | (2006.01) |
| *B32B 27/30* | (2006.01) |
| *B32B 27/32* | (2006.01) |
| *B32B 27/34* | (2006.01) |
| *B32B 27/36* | (2006.01) |
| *C09J 7/24* | (2018.01) |
| *C09J 7/29* | (2018.01) |
| *C09J 5/00* | (2006.01) |

(52) U.S. Cl.
CPC .......... *B32B 27/306* (2013.01); *B32B 27/308* (2013.01); *B32B 27/32* (2013.01); *B32B 27/322* (2013.01); *B32B 27/325* (2013.01); *B32B 27/34* (2013.01); *B32B 27/36* (2013.01); *B32B 27/365* (2013.01); *B65D 25/205* (2013.01); *C09J 5/00* (2013.01); *C09J 7/241* (2018.01); *C09J 7/29* (2018.01); *B32B 2255/10* (2013.01); *B32B 2255/12* (2013.01); *B32B 2255/26* (2013.01); *B32B 2270/00* (2013.01); *B32B 2307/30* (2013.01); *B32B 2307/412* (2013.01); *B32B 2307/54* (2013.01); *B32B 2307/554* (2013.01); *B32B 2307/736* (2013.01); *B32B 2307/748* (2013.01); *B32B 2405/00* (2013.01); *B32B 2519/00* (2013.01); *C09J 2203/334* (2013.01); *C09J 2301/162* (2020.08); *C09J 2301/502* (2020.08); *C09J 2423/006* (2013.01); *G09F 2003/0242* (2013.01); *G09F 2003/0251* (2013.01); *G09F 2003/0272* (2013.01); *Y10T 156/1111* (2015.01); *Y10T 428/1476* (2015.01); *Y10T 428/28* (2015.01); *Y10T 428/2848* (2015.01)

(56) References Cited

U.S. PATENT DOCUMENTS

| | | |
|---|---|---|
| 4,536,060 A | 8/1985 | Takamatsu et al. |
| 4,562,684 A | 1/1986 | Dreher |
| 4,608,284 A | 8/1986 | Roales |
| 4,662,965 A | 5/1987 | DiFrank et al. |
| 4,725,454 A | 2/1988 | Galli et al. |
| 4,744,918 A | 5/1988 | Heppke et al. |
| 4,879,177 A | 11/1989 | Boice |
| 5,100,963 A | 3/1992 | Lin |
| 5,156,911 A | 10/1992 | Stewart |
| 5,190,609 A | 3/1993 | Lin et al. |
| 5,229,447 A | 7/1993 | Miyajima et al. |
| 5,251,048 A | 10/1993 | Doane et al. |
| 5,292,566 A | 3/1994 | Shacklett, III |
| 5,330,961 A | 7/1994 | Takeyama et al. |
| 5,384,067 A | 1/1995 | Doane et al. |
| 5,387,450 A | 2/1995 | Stewart |
| 5,437,811 A | 8/1995 | Doane et al. |
| 5,466,496 A | 11/1995 | Jin |
| 5,626,955 A | 5/1997 | Goetz et al. |
| 5,665,443 A | 9/1997 | Hata et al. |
| 5,668,614 A | 9/1997 | Chien et al. |
| 5,668,651 A | 9/1997 | Yamada et al. |
| 5,691,795 A | 11/1997 | Doane et al. |
| 5,695,682 A | 12/1997 | Doane et al. |
| 5,709,391 A | 1/1998 | Arakawa et al. |
| 5,709,937 A | 1/1998 | Adams et al. |
| 5,712,031 A | 1/1998 | Ketch et al. |
| 5,725,966 A | 3/1998 | Abe et al. |
| 5,748,277 A | 5/1998 | Huang et al. |
| 5,766,508 A | 6/1998 | Kawasumi et al. |
| 5,766,694 A | 6/1998 | West et al. |
| 5,928,803 A | 7/1999 | Yasuda |
| 5,929,960 A | 7/1999 | West et al. |
| 5,940,150 A | 8/1999 | Faris et al. |
| 5,964,975 A | 10/1999 | Hinton |
| 6,042,930 A | 3/2000 | Keich et al. |
| 6,049,366 A | 4/2000 | Hakemi et al. |
| 6,072,549 A | 6/2000 | Faris et al. |
| 6,106,982 A | 8/2000 | Mientus et al. |
| 6,108,062 A | 8/2000 | Takeuchi et al. |
| 6,136,903 A | 10/2000 | Su et al. |
| 6,153,288 A | 11/2000 | Shih et al. |
| 6,249,332 B1 | 6/2001 | Bryan-Brown et al. |
| 6,319,428 B1 | 11/2001 | Michot et al. |
| 6,416,857 B1 | 7/2002 | Wright et al. |
| 6,429,961 B1 | 8/2002 | Harary et al. |
| 6,508,560 B2 | 1/2003 | Epstein et al. |
| 6,621,539 B2 | 9/2003 | Nakamura |
| 6,674,504 B1 | 1/2004 | Li et al. |
| 6,680,097 B1 | 1/2004 | Amberger et al. |
| 6,680,758 B1 | 1/2004 | Faris |
| 6,726,969 B1 | 4/2004 | Balaji et al. |
| 6,761,969 B2 | 7/2004 | Li et al. |
| 6,821,592 B2 | 11/2004 | Rodick |
| 6,927,267 B1 | 8/2005 | Varela de la Rosa et al. |
| 7,144,542 B2 | 12/2006 | Holzer et al. |
| 7,217,463 B2 | 5/2007 | Henderson |
| 7,294,380 B2 | 11/2007 | Squier et al. |
| 7,514,131 B2 | 4/2009 | Funato et al. |
| 7,700,189 B2 | 4/2010 | Amon et al. |
| 8,535,464 B2 | 9/2013 | Lorence et al. |
| 9,387,652 B2 | 7/2016 | Doornheim et al. |
| 2001/0003765 A1 | 6/2001 | Mallya |
| 2001/0018125 A1 | 8/2001 | Shibuya et al. |
| 2002/0084565 A1 | 7/2002 | Dautartas et al. |
| 2002/0119292 A1 | 8/2002 | Venkatasanthanam et al. |
| 2003/0083523 A1 | 5/2003 | Ando et al. |
| 2003/0150148 A1 | 8/2003 | Spear et al. |
| 2003/0193709 A1 | 10/2003 | Mallya et al. |
| 2003/0207065 A1 | 11/2003 | Sher et al. |
| 2004/0033349 A1 | 2/2004 | Henderson |
| 2004/0038026 A1 | 2/2004 | Li et al. |
| 2004/0219321 A1 | 11/2004 | Squier et al. |
| 2005/0083564 A1 | 4/2005 | Mallya et al. |
| 2005/0090619 A1 | 4/2005 | Yoshimura |
| 2006/0036556 A1 | 2/2006 | Knispel |
| 2006/0228504 A1 | 10/2006 | Wilkie |
| 2006/0251891 A1 | 11/2006 | Aarnio |
| 2006/0263600 A1 | 11/2006 | Bartholomew et al. |
| 2006/0269755 A1 | 11/2006 | Song |
| 2006/0275602 A1 | 12/2006 | Nakada et al. |
| 2007/0098933 A1* | 5/2007 | Opuszko ............... B32B 27/325 428/35.2 |
| 2007/0154668 A1 | 7/2007 | Rhee et al. |
| 2007/0213449 A1 | 9/2007 | Lewandowski |
| 2008/0118740 A1 | 5/2008 | Kuwahara et al. |
| 2008/0191880 A1 | 8/2008 | Tuffe et al. |
| 2008/0197540 A1 | 8/2008 | McAllister et al. |
| 2009/0218307 A1 | 9/2009 | Davies et al. |
| 2009/0233067 A1 | 9/2009 | Doornheim et al. |
| 2010/0051200 A1 | 3/2010 | Mueller et al. |
| 2010/0285249 A1 | 11/2010 | Mitchell et al. |
| 2012/0034402 A1 | 2/2012 | Henderson |
| 2013/0008613 A1 | 1/2013 | Henderson |

(56) References Cited

U.S. PATENT DOCUMENTS

| | | | |
|---|---|---|---|
| 2013/0146230 A1 | 6/2013 | Davies et al. | |
| 2015/0255008 A1 | 9/2015 | Henderson | |

FOREIGN PATENT DOCUMENTS

| | | |
|---|---|---|
| CN | 1608083 | 4/2005 |
| CN | 1692386 | 11/2005 |
| CN | 1791651 | 6/2006 |
| CN | 101246653 | 8/2008 |
| CN | 101258213 | 9/2008 |
| CN | 101102889 | 9/2011 |
| DE | 3909089 | 9/1990 |
| DE | 19716875 | 11/1997 |
| EP | 0317180 | 5/1989 |
| EP | 0471767 | 2/1992 |
| EP | 0498249 | 8/1998 |
| EP | 0924678 | 6/1999 |
| EP | 1055715 | 11/2000 |
| EP | 1116745 | 7/2001 |
| EP | 0951004 | 12/2003 |
| EP | 1375621 | 1/2004 |
| EP | 1688445 | 8/2006 |
| EP | 1743006 | 1/2007 |
| EP | 1866895 | 12/2007 |
| EP | 2328694 | 6/2011 |
| GB | 2259291 | 3/1993 |
| GB | 2411877 | 9/2005 |
| GB | 2411881 | 9/2005 |
| GB | 2424865 | 10/2006 |
| GB | 2425107 | 10/2006 |
| JP | 5-173487 | 7/1993 |
| JP | 6-158006 | 6/1994 |
| JP | 6-266288 | 9/1994 |
| JP | 9-251272 | 9/1997 |
| JP | 11-057558 | 3/1999 |
| JP | 11-246395 | 9/1999 |
| JP | 11-273636 | 10/1999 |
| JP | 2000-144086 | 5/2000 |
| JP | 2000-271204 | 10/2000 |
| JP | 2002-071204 | 3/2002 |
| JP | 2002-322448 | 11/2002 |
| KR | 10-0369453 | 1/2003 |
| MX | 2007008258 | 8/2007 |
| RU | 2160932 | 12/2000 |
| RU | 26272 | 11/2002 |
| WO | 92/13901 | 8/1992 |
| WO | 93/23496 | 11/1993 |
| WO | 95/34263 | 12/1995 |
| WO | 97/11996 | 4/1997 |
| WO | 98/38547 | 9/1998 |
| WO | 99/19415 | 4/1999 |
| WO | 99/058421 | 11/1999 |
| WO | 99/63400 | 12/1999 |
| WO | 00/13887 | 3/2000 |
| WO | 00/13888 | 3/2000 |
| WO | 00/60407 | 10/2000 |
| WO | 01/40853 | 6/2001 |
| WO | 01/42325 | 6/2001 |
| WO | 01/59024 | 8/2001 |
| WO | 02/42832 | 5/2002 |
| WO | 02/074874 | 9/2002 |
| WO | 03/087251 | 10/2003 |
| WO | 03/099953 | 12/2003 |
| WO | 2004/061037 | 7/2004 |
| WO | 2004/092295 | 10/2004 |
| WO | 2005/085381 | 9/2005 |
| WO | 2006/033925 | 3/2006 |
| WO | 2006/076327 | 7/2006 |
| WO | 2006/078038 | 7/2006 |
| WO | 2006/106309 | 10/2006 |
| WO | 2007/030583 | 3/2007 |
| WO | 2008/057926 | 5/2008 |
| WO | 2008/093333 | 8/2008 |
| WO | 2008/124581 | 10/2008 |
| WO | 2009/043975 | 4/2009 |
| WO | 2010/027507 | 3/2010 |
| WO | 2010/117767 | 10/2010 |
| WO | 2010/117774 | 10/2010 |
| WO | 03/029002 | 4/2013 |

OTHER PUBLICATIONS

Wypych, George (2012), Handbook of Polymers . . . ChemTec Publishing, Online version available at: http://www.knovel.com.web.portal/brows/display?_EXT_KNOVEL_DISPLAY_bookid=5141&verticalID=0.

TOPAS 8007S datasheet, available at http://www.topas.com/sites/default/files/TDS_8007S_04_e_1.pdf (2014).

TOPAS 9506F-500 datasheet, available at http://www.topas.com/sites/default/files/TDS_9506F-500_e_0.pdf (2014).

International Search Report issued in corresponding IA No. PCT/US2010/029178 dated Aug. 6, 2010.

International Preliminary Report on Patentability issued in corresponding IA No. PCT/US2010/029178 dated Jun. 9, 2011.

Wood et al., "5.1: Large Area, High Resolution Portable ZBD Dispiay", SID 02 Digest, ISSN/002-0866X/02/3301-0022-$1.00 © 2002 SID, pp. 22-25.

Pentermann et al., Letters to Nature, "Single-substrate liquid-crystal dispiays by photo-enforced stratification", Nature/vol. 417/May 2, 2002/www.nature.com, © 2002 Maxmillan Magazines Ltd., pp. 55-58.

Polylactic Acid Technology; http://www.jimluntllc.com/pdfs/polylactic_acid_technology.pdf.

The Engineering Toolbox; http://engineeringtoolbox.com/linear-expansion-coefficients-d_95.html.

\* cited by examiner

REMOVABLE ADHESIVE LABEL CONTAINING INHERENTLY SHRINKABLE POLYMERIC FILM

CROSS-REFERENCE TO RELATED APPLICATION

The present application is a division of U.S. patent application Ser. No. 14/694,650 filed Apr. 23, 2015, which is a continuation of U.S. patent application Ser. No. 13/262,439 filed Sep. 30, 2011, which is a 371 of International Application No. PCT/US2010/029178 which was published in English on Oct. 14, 2010, and claims priority to U.S. Provisional Application No. 61/164,680 filed Mar. 30, 2009, all of which are incorporated by reference herein in their entireties.

BACKGROUND OF THE INVENTION

Field of the Invention

The present invention involves an adhesive label that contains an inherently shrinkable polymeric film and a related labeled container. The label is useful in various labeling applications and especially in adhesive labeling applications involving reusable and recyclable containers.

Description of the Related Art

Labels are applied to numerous articles of commerce to convey information regarding a manufacturer and a product. Articles of commerce include plastic, paper, metal and glass containers for a multitude of consumer and industrial products such as for example bottled beverage industry products. A particularly demanding labeling application is for reusable and recyclable beverage bottles, especially for the bottled beer industry, where the label requirements generally include high clarity visual aesthetics, abrasion resistance during processing and handling of beverage bottles, resistance to any deleterious effects due to moisture during cold storage or a pasteurization process, and removability of the label from the bottle during a washing process in a warm or hot washing fluid such as for example a 50 to 90° C. aqueous caustic solution where the removed label does not clog the washing process equipment. The washing process allows the washed bottle to consequently be reused or recycled. The washed bottle offers the flexibility of being refilled and relabeled for any number of beverage products. Labels currently employed for reusable and recyclable beverage bottles include paper labels and stretched, thermally shrinkable polymeric labels. Paper labels lack high clarity visual aesthetics. Stretched, thermally shrinkable polymeric labels upon removal tend to curl up tightly into a needle shape which can clog washing process equipment. Labels meeting the requirements for the reusable and recyclable bottled beverage industry are desirable.

BRIEF SUMMARY OF THE INVENTION

An exemplary embodiment of the present invention is a label where the label comprises (a) a film having a first surface and a second surface and comprising a first film layer, and (b) an adhesive layer having a first surface and a second surface and comprising an adhesive where the first surface of the adhesive layer is adhesively joined to the second surface of the film, where the first film layer comprises at least one non-oriented thermoplastic polymer where the thermoplastic polymer has a glass transition temperature in the range of from about 40° C. to about 190° C., the first film layer has a tensile modulus (American Society for Testing and Materials, hereinafter "ASTM" D882) in a machine direction in ambient air and a tensile modulus (ASTM D882) in the machine direction after heating where the tensile modulus in the machine direction after immersion heating is less than the tensile modulus in the machine direction in ambient air. In a further embodiment, the first film layer has an areal shrinkage (ASTM D1204) of at least about 5.3% after immersion in water at a temperature of about 80° C. for at least about 3 minutes.

Another exemplary embodiment is the above described label where the film is a monolayered film.

Another exemplary embodiment is the above described label where the film is a multilayered film.

Another exemplary embodiment is the above described label where the first film layer comprises two or more layers where each of the two or more layers comprises at least one thermoplastic polymer where the thermoplastic polymer has a glass transition temperature in the range of from about 40° C. to about 190° C. In a further embodiment, each of the two or more layers has a tensile modulus (ASTM D882) in a machine direction after heating which is less than the tensile modulus in the machine direction in ambient air. In a further embodiment, each of the two or more layers has an areal shrinkage (ASTM D1204) of at least 5.3% after immersion in water at a temperature of about 80° C. for at least about 3 minutes, and each of the two or more layers is nonoriented.

Another exemplary embodiment is the above described label where the film comprises a second film layer where the second film layer comprises one or more layers where each of the one or more layers of the second film layer comprises at least one thermoplastic polymer, and each of the one or more layers of the second film layer has a tensile modulus in the machine direction after heating that is less than the tensile modulus in the machine direction in ambient air. In a further embodiment, each of the layers has an areal shrinkage (ASTM D1204) of less than 5.3% after immersion in water at a temperature of about 80° C. for at least about 3 minutes. In a further embodiment, each of the layers has a combination of the two foregoing properties.

Another exemplary embodiment is the above described label where the label comprises a release liner having a first surface and a second surface where the first surface of the release liner is releasably attached to the second surface of the adhesive layer.

Another exemplary embodiment is a labeled container that includes the above described label and a container where (i) the label is attached to the container having a horizontal axis where the second surface of the adhesive layer is adhesively joined to an outer surface of the container, (ii) the machine direction or the transverse direction of the first film layer circumferentially follows the horizontal axis of the container. In a further embodiment, the label is removable from the container after immersion in a liquid where the temperature of the liquid is at least 50° C. and the label detaches from the container.

Other embodiments of the present invention will become apparent from the following Detailed Description of the Preferred Embodiments taken in conjunction with the accompanying Drawings and the appended Claims, all of which exemplarily illustrate the principles of the present invention, but do not limit the invention.

BRIEF DESCRIPTION OF THE DRAWINGS

The components in the figures of the appended drawings are not to scale. Components appearing in more than one figure have been given the same reference number to show the correspondence.

DETAILED DESCRIPTION OF THE PREFERRED EMBODIMENTS

Figure 4:
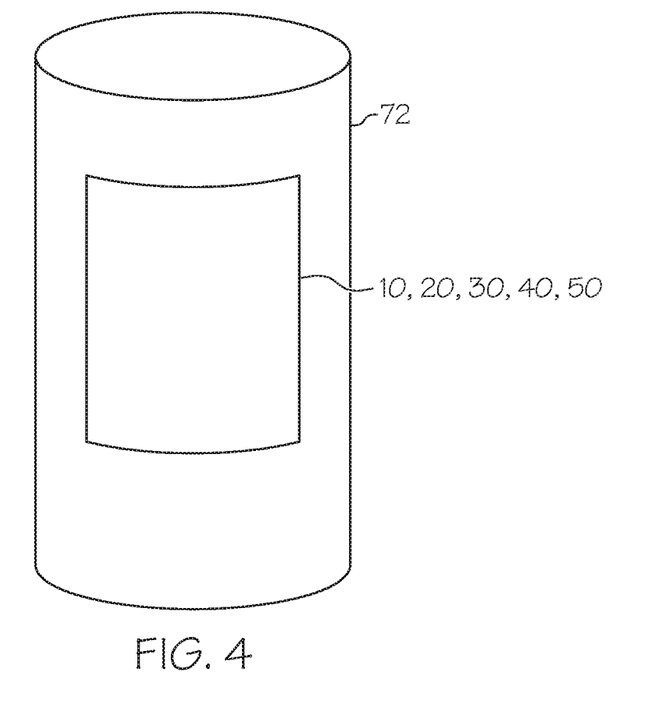
FIG. 4 is a perspective view of a label attached to a cylindrically shaped container according to a preferred embodiment.

Referring to FIG. 4, a label 10, 20, 30, 40 or 50 of the present invention is useful in commercial labeling applications that include labeling of articles of commerce such as for example plastic, paper, metal and glass containers 72 for a multitude of consumer and industrial products. The container can be any shaped container including a bottle, a jug, a jar or a drum. In an embodiment the container is a glass beverage bottle having a cylindrically shaped body that includes a beer bottle. The label, as described hereinbelow, on a labeled container has high clarity visual aesthetics, abrasion resistance during processing and handling of the container, resistance to any deleterious effects due to moisture during cold storage or a pasteurization process, and removability of the label from the container during a washing process in a warm or hot washing fluid that includes a 50 to 100° C. water bath or aqueous caustic solution where the removed label does not clog the washing process equipment.

First Film Layer

Figure 1A:
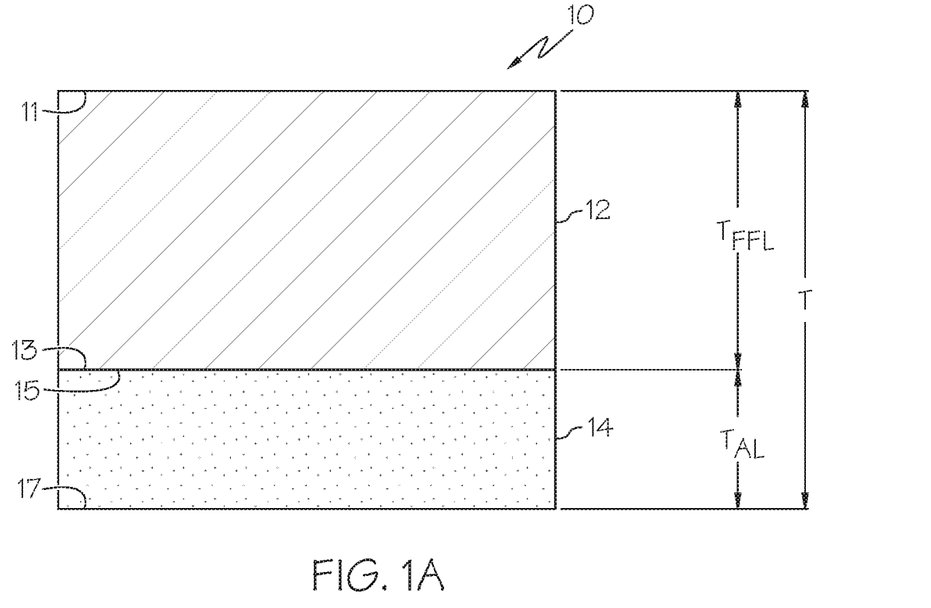
FIG. 1A is a sectional view of a label containing two layers according to a preferred embodiment.
Figure 1B:
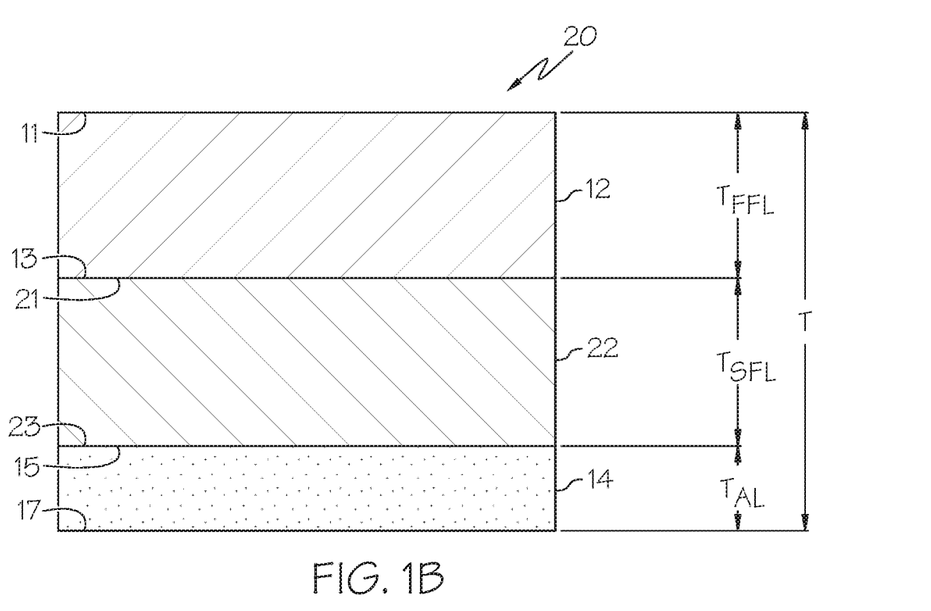
FIG. 1B is a sectional view of a label containing three layers according to a preferred embodiment.
Figure 1C:
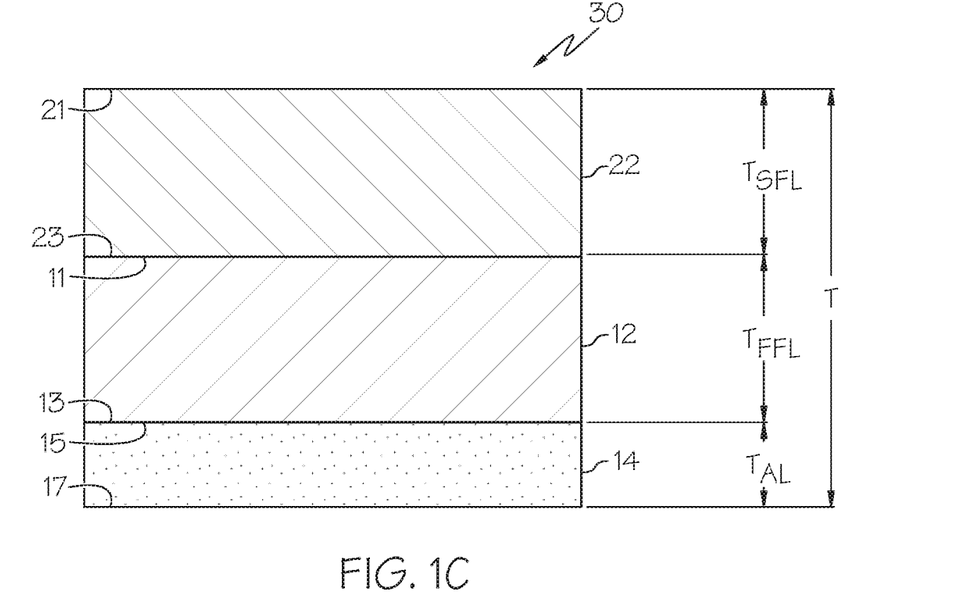
FIG. 1C is a sectional view of a label containing three layers according to a preferred embodiment.
Figure 1D:
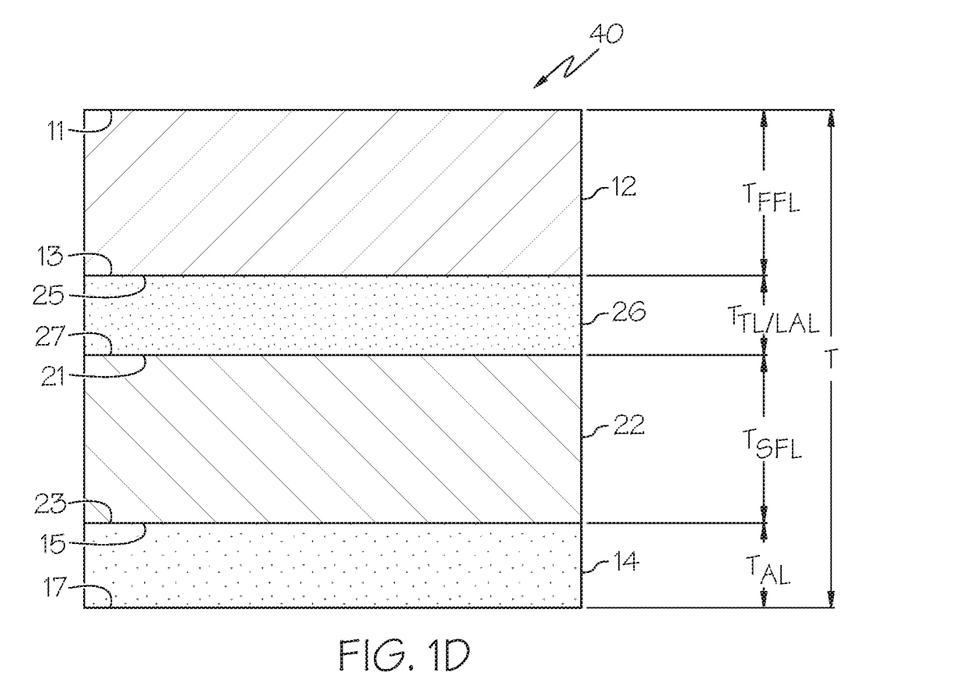
FIG. 1D is a sectional view of a label containing four layers according to a preferred embodiment.
Figure 1E:
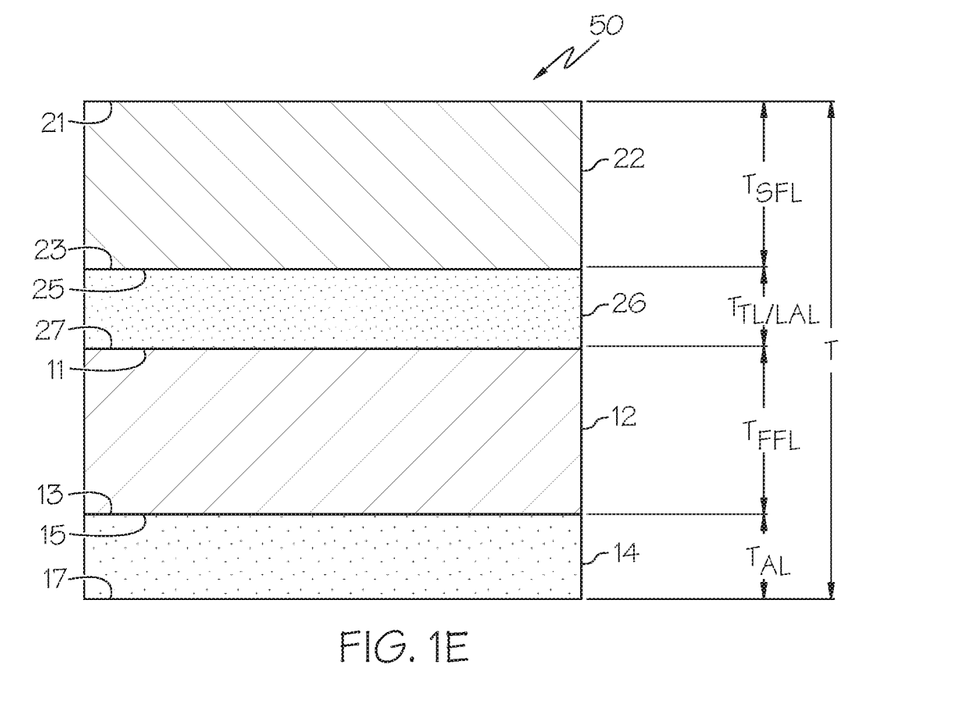
FIG. 1E is a sectional view of a label containing four layers according to a preferred embodiment.
Figure 2:
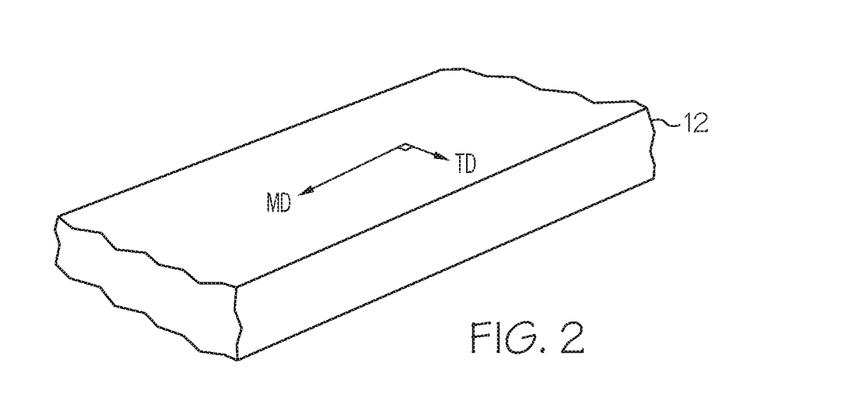
FIG. 2 is a perspective view of a first film layer of a label showing a machine direction and a transverse direction.

Referring to FIGS. 1A, 1B, 1C, 1D and 1E the labels 10, 20, 30, 40 and 50 of the present invention comprise a first film layer 12. The first film layer has a relatively substantial loss in tensile modulus when immersed in a warm or hot washing fluid compared to the tensile modulus of the first film layer in ambient air. In embodiments the first film layer has a tensile modulus (ASTM D882) in a machine direction in 23° C. ambient air and a tensile modulus (ASTM D882) in the machine direction after immersion in water at a temperature of about 80° C. for at least about 3 minutes where the tensile modulus in the machine direction after immersion in water at a temperature of about 80° C. for at least about 3 minutes is at least 40%, at least 47%, or at least 53% of the tensile modulus in the machine direction in 23° C. ambient air. Ambient air can have a relative humidity ranging from 0 to 100% and typically ranging from 30 to 70%, 40 to 60%, or 45 to 55%. Referring to FIG. 2, the first film layer 12 has three directions or dimensions to include a machine direction (MD) and a transverse direction (TD) where the machine direction is the direction that the first film layer is advanced during its manufacture and the transverse direction is the direction that is normal or perpendicular to the machine direction and the machine and transverse directions lie in the largest areal plane of the first film layer. The third direction or dimension of the first film layer is its thickness which is perpendicular to the areal plane containing the machine and transverse directions. In embodiments the first film layer has a tensile modulus (ASTM D882) in a machine direction in 23° C. ambient air and a tensile modulus (ASTM D882) in the machine direction after immersion in water at a temperature of about 80° C. for at least about 3 minutes where the tensile modulus in the machine direction after immersion in water at a temperature of about 80° C. for at least about 3 minutes is 40 to 66%, 47 to 65%, or 53 to 64% of the tensile modulus in the machine direction in 23° C. ambient air. In embodiments the first film layer has a tensile modulus (ASTM D882) in the machine direction of at least 800 MPa (megapascals), at least 1024 MPa, or at least 1236 MPa after immersion in water at a temperature of about 80° C. for at least about 3 minutes. The first film layer has a relatively high two-dimensional change in area as measured in the machine direction and the transverse direction after immersion in a warm or hot washing fluid. In embodiments the first film layer has an areal shrinkage (ASTM D1204) of at least 5.3%, at least 7.9%, or at least 10.5% after immersion in water at a temperature of about 80° C. for at least about 3 minutes. The areal shrinkage results in a reduction in the area of the first film layer as measured in the machine direction and the transverse direction. The first film layer is nonoriented, as described in more detail hereinbelow, and has a significant inherent shrinkage when heated above ambient temperature where the ambient temperature can range from 10 to 50° C. Usually a film layer containing a thermoplastic polymer requires a stretching or orientation step without an annealing step or with a partial annealing step in order to have significant linear or areal shrinkage when heated above ambient temperature. In embodiments the first film layer is nonoriented and has a significant inherent shrinkage where the first film layer has an areal shrinkage (ASTM D1204) as measured in the machine direction and transverse direction in 80° C. ambient air of at least 6%, at least 10.1%, or at least 14.2%. The relative humidity of 80° C. ambient air can range from 0 to 100%, 0 to 70%, or 0 to 40%.

The first film layer comprises at least one thermoplastic polymer. In embodiments the thermoplastic polymer of the first film layer has a glass transition temperature in the range of 40 to 190° C., 45 to 145° C., 50 to 100° C., or 55 to 75° C. The glass transition temperature can be measured using a differential scanning calorimeter. In embodiments the thermoplastic polymer of the first film layer comprises a polymer selected from the group consisting of a cyclic olefin homopolymer, a cyclic olefin copolymer, and a mixture of two or more of any of the foregoing polymers. A mixture of two or more of any of the foregoing polymers is defined as including a mixture of two or more polymers of the same kind such as for example two or more cyclic olefin homopolymers or a mixture of one or more polymers of one kind and one or more polymers of one or more different kinds such as for example a mixture of one or more cyclic olefin homopolymers and one or more cyclic olefin copolymers. Cyclic olefins include unsaturated alicyclics which include aliphatic hydrocarbons having one or more rings and one or more double bonds where the one or more double bonds can be located within the one or more rings and/or external to the one or more rings as an attachment or attachments. Cyclic olefins include for example cyclobutenes, cyclopentenes to include cyclopentene and 1-methylcyclopentene, norbornenes to include norbornene, vinylcyclohexane, and dicyclopentadiene. In an embodiment the cyclic olefin includes unsaturated alicyclics having one double bond where the double bond is located within a ring. In an embodiment the cyclic olefin copolymer includes copolymers derived from at least one cyclic olefin monomer and at least one alpha-olefin monomer. The alpha-olefin monomer can contain 2 to 12 carbon atoms, 2 to 8 carbon atoms, or 2 to 4 carbon atoms. In embodiments the cyclic olefin copolymer can have a cyclic olefin content on a weight basis of 40 to 90%, 50 to 80%, or 60 to 70%. The cyclic olefin homopolymers and cyclic olefin copolymers can be prepared respectively from a cyclic olefin monomer or from at least one cyclic olefin monomer and at least one alpha-olefin monomer using a polymerization catalyst to include a Ziegler-Natta catalyst or a metallocene catalyst. Useful cyclic olefin homopolymers and copolymers include for example the APEL™ cyclic olefin copolymer series from Mitsui Chemicals America, Inc. of Rye Brook, N.Y., the ZEONEX™ cyclic olefin homopolymer series and the ZEONOR™ cyclic olefin copolymer series from Zeon Chemicals L. P. of Louisville, Ky., and the TOPAS' ethylene-norbornene based cyclic olefin copolymer series from TOPAS Advanced Polymers, Inc. of Florence, Ky.

The film or a film layer or film layers of the film, to include the first film layer, can contain one or more additives to improve processing during film manufacture and during conversion to a label and to improve label end use performance. The additives include a nucleating agent, an antiblocking agent, a processing aid, a slip agent, an antistatic agent, a pigment, a cavitating agent, an inorganic filler, a heat stabilizer, an antioxidant, a flame retardant, an acid acceptor, a visible and/or ultraviolet light stabilizer, or a mixture of two or more of any of the foregoing additives. The additives can be present in the above described thermoplastic polymers as supplied by a vendor or can be introduced into the film or a film layer as an additive concentrate where the additive is present generally in a relatively large amount of 2 to 90% by weight, depending on its use, in the concentrate with a thermoplastic polymer carrier. The additives, depending on their use, can be present in the film or a film layer from 0.001% to 90% by weight. Additives for use in the film or a film layer are further described in U.S. Pat. No. 6,821,592 to Rodick and U.S. Pat. No. 7,217,463 to Henderson.

In an embodiment the first film layer is monolayered and has only one layer. In another embodiment the first film layer is multilayered and has two or more layers. In embodiments the one layer of the monolayered first film layer or each of the two or more layers of the multilayered first film layer comprises at least one thermoplastic polymer where the thermoplastic polymer has a glass transition temperature in the range of 40 to 190° C., 45 to 145° C., 50 to 100° C., or 55 to 75° C., the one layer of the monolayered first film layer or each of the two or more layers of the multilayered first film layer has a tensile modulus (ASTM D882) in a machine direction in 23° C. ambient air and a tensile modulus (ASTM D882) in the machine direction after immersion in water at a temperature of about 80° C. for at least about 3 minutes where the tensile modulus in the machine direction after immersion in water at a temperature of about 80° C. for at least about 3 minutes is at least 40%, at least 47%, or at least 53% of the tensile modulus in the machine direction in 23° C. ambient air, the one layer of the monolayered first film layer or each of the two or more layers of the multilayered first film layer has an areal shrinkage (ASTM D1204) of at least 5.3%, at least 7.9%, or at least 10.5% after immersion in water at a temperature of about 80° C. for at least about 3 minutes, and the one layer of the monolayered first film layer or each of the two or more layers of the multilayered first film layer is nonoriented. In embodiments the one layer of the monolayered first film layer or each of the two or more layers of the multilayered first film layer has a tensile modulus (ASTM D882) in a machine direction in 23° C. ambient air and a tensile modulus (ASTM D882) in the machine direction after immersion in water at a temperature of about 80° C. for at least about 3 minutes where the tensile modulus in the machine direction after immersion in water at a temperature of about 80° C. for at least about 3 minutes is 40 to 66%, 47 to 65%, or 53 to 64% of the tensile modulus in the machine direction in 23° C. ambient air. In embodiments the one layer of the monolayered first film layer or each of the two or more layers of the multilayered first film layer has a tensile modulus (ASTM D882) in the machine direction of at least 812 MPa (megapascals), at least 1024 MPa, or at least 1236 MPa after immersion in water at a temperature of about 80° C. for at least about 3 minutes. In embodiments the one layer of the monolayered first film layer or each of the two or more layers of the multilayered first film layer is nonoriented and has an areal shrinkage (ASTM D1204) as measured in the machine direction and transverse direction in 80° C. ambient air of at least 6%, at least 10.1%, or at least 14.2%. In an embodiment the first film layer, as described hereinabove, can contain one or more other thermoplastic polymers provided that the first film layer maintains its tensile modulus and dimensional change properties as described hereinabove.

Second Film Layer

Referring to FIGS. 1B, 1C, 1D and 1E the labels 20, 30, 40 and 50 of the present invention comprise a film that comprises a second film layer 22. The second film layer compared to the first film layer, after immersion in water at a temperature of about 80° C., has a higher loss in tensile modulus in a machine direction or a lower areal dimensional change or a combination of the two foregoing properties. In an embodiment the second film layer is monolayered and has only one layer. In another embodiment the second film layer is multilayered and has two or more layers. In embodiments the second film layer comprises one or more layers where each of the one or more layers comprises at least one thermoplastic polymer, and each of the one or more layers of the second film layer has a property selected from the group consisting of a tensile modulus (ASTM D882) in a machine direction in 23° C. ambient air and a tensile modulus (ASTM D882) in the machine direction after immersion in water at a temperature of about 80° C. for at least about 3 minutes where the tensile modulus in the machine direction after immersion in water at a temperature of about 80° C. for at least about 3 minutes is less than 40%, less than 35%, or less than 30% of the tensile modulus in the machine direction in 23° C. ambient air, an areal shrinkage (ASTM D1204) of less than 5.3%, less than 4.2%, or less than 3.5% after immersion in water at a temperature of about 80° C. for at least about 3 minutes, and a combination of the two foregoing properties.

The at least one thermoplastic polymer of the second film layer comprises a polymer selected from the group consisting of a polyolefin, a (meth)acrylate polymer, a styrene polymer, a polyester, a halogen-containing polymer, a polycarbonate, a polyacrylonitrile, an aromatic polyether, an aromatic polyimide, an aromatic polyamide-imide, an olefin-vinyl alcohol copolymer, a polyamide, and a mixture of two or more of any of the foregoing polymers. In embodiments the aromatic polyether includes an aromatic polyether selected from the group consisting of an aromatic polyether ketone, an aromatic polyetheretherketone, an aromatic polyether imide, an aromatic polysulfone, an aromatic polyethersulfone, a polyphenylsulfone, and a mixture of two or more of any of the foregoing aromatic polyethers. In embodiments the thermoplastic polymer of the second film layer comprises a polymer selected from the group consisting of an isotactic polypropylene homopolymer, an isotactic polypropylene random copolymer, a poly(alkyl methacrylate), a polystyrene homopolymer, an aromatic polycarboxylic acid based polyester, a polylactic acid, an aromatic polycarbonate, an aromatic polyetherketone, an aromatic polyetheretherketone, an aromatic polyether imide, an aromatic polysulfone, an aromatic polyethersulfone, a polyphenylsulfone, an aromatic polyimide, an aromatic polyamide-imide, an ethylene-vinyl alcohol copolymer, an aromatic polyamide, and a mixture of two or more of any of the foregoing polymers.

The (meth)acrylate polymer of the second film layer includes homopolymers of an alkyl acrylate or of an alkyl methacrylate, copolymers of two or more alkyl acrylates or of two or more alkyl methacrylates where the two or more alkyl acrylates or alkyl methacrylates differ in the number of carbon atoms in the alkyl group, copolymers of one or more alkyl acrylates and one or more alkyl methacrylates, and mixtures of two or more of any of the foregoing polymers. In an embodiment the (meth)acrylate polymer includes homopolymers of an alkyl methacrylate where the alkyl group has 1 to 12 or 1 to 8 or 1 to 4 carbon atoms and the alkyl methacrylate homopolymer has a density of 1.05 to 1.25 g/cm$^3$ and a melt flow rate (ASTM D1238) at 230° C./3.8 kg of 0.5 to 40 g/10 minutes. In an embodiment the (meth)acrylate polymer contains an impact modifier where the impact modifier is a polymeric elastomer which can be derived from an aromatic monomer to include for example styrene-butadiene rubber impact modifiers. The (meth)acrylate polymers are generally prepared by a catalyzed polymerization such as for example by free radical catalysis. Useful (meth)acrylate polymers include alkyl methacrylate homopolymers such as for example the ALTUGLAS® and PLEXIGLAS® poly(methyl methacrylate) resin series manufactured by Arkema Inc. of Philadelphia, Pa., and the LUCITE® poly(methyl methacrylate) resin series manufactured by Lucite International of Parkersburg, W. Va.

The polyamide of the second film layer includes polymers selected from the group consisting of a nonaromatic polyamide, an aromatic polyamide, and mixtures of two or more of any of the foregoing polymers. Nonaromatic polyamides do not contain repeating aromatic groups while aromatic polyamides contain only repeating aromatic groups or contain both repeating aromatic groups and repeating nonaromatic groups. Polyamides can be prepared by a condensation of an amino carboxylic acid or an amino carboxylic acid halide monomer, by a ring opening polymerization of a lactam to include for example a ring opening polymerization of caprolactam to form polycaprolactam or nylon 6, or by a condensation of a polyamine monomer and a polycarboxylic acid or polycarboxylic acid halide monomer to include for example the condensation of 1,6-hexanediamine and adipic acid or adipic acid chloride to form the polyamide nylon 66. Useful polyamides include for example the nonaromatic nylon 6 and nylon 66 ULTRAMID® resins from BASF Corporation of Florham Park, N.J. and the aromatic nylon MXD6 resins from Mitsubishi Gas Chemical American, Inc. of New York, N.Y. where the nylon MXD6 resins are derived from meta-xylylenediamine and adipic acid or an adipic acid halide.

The polycarbonate of the second film layer includes polymers that have repeating hydrocarbon based groups linked together by carbonate groups which are also known as carbonyldioxy groups. In an embodiment the polycarbonate has a density of 1.1 to 1.32 g/cm$^3$ and a melt flow rate (ASTM D1238) at 300° C./1.2 kg of 0.5 to 40 g/10 minutes. In embodiments the polycarbonate includes an aromatic polycarbonate, a nonaromatic polycarbonate, or a mixture of two or more of any of the foregoing polycarbonates. The nonaromatic polycarbonates include polymers which can be prepared by metal catalyzed reaction of an epoxide with carbon dioxide. The aromatic polycarbonates include polymers which can be prepared by reaction of a polyhydroxy-substituted arene, to include for example bisphenol A also known as 4,4'-isopropylidenediphenol, with phosgene or a dialkyl or diaryl carbonate to include for example dimethyl carbonate. Arenes are aromatic unsaturated cyclic hydrocarbons. Useful polycarbonates include for example the polycarbonate MAKROLON® 1804, from Bayer Material Science of Baytown, Tex., which has a density of 1.2 g/cm$^3$ and a melt flow rate (ASTM D1238) at 300° C./1.2 kg of 6.5 g/10 minutes, and the polycarbonate LUPILON® S3000R, from Mitsubishi Chemical and available through Polymer Technology & Services, LLC of Murfreesboro, Tenn., which has a density of 1.2 g/cm$^3$ and a melt flow rate (ASTM D1238) at 300° C./1.2 kg of 16.5 g/10 minutes and is made from bisphenol A.

The olefin-vinyl alcohol copolymer of the second film layer includes at least one copolymer of an olefin monomer containing 2 to 12 carbon atoms and a vinyl alcohol monomer. The olefin-vinyl alcohol copolymer can be prepared by polymerizing at least one olefin monomer and a vinyl acetate monomer using a free radical catalyst to form an olefin-vinyl acetate copolymer which is then hydrolyzed to form the olefin-vinyl alcohol copolymer. In an embodiment the olefin-vinyl alcohol copolymer is an ethylene-vinyl alcohol copolymer. In embodiments the olefin content of the olefin-vinyl alcohol copolymer on a mole basis ranges from 5% to 90%, 12% to 73%, 20% to 55%, or 25% to 50%. In embodiments an ethylene-vinyl alcohol copolymer has a glass transition temperature in the range of 40 to 90° C., 45 to 85° C., 47 to 80° C., or 60 to 80° C. Useful olefin-vinyl alcohol copolymers include for example the ethylene-vinyl alcohol copolymer EVAL® resins from EVAL Americas of Houston, Tex.

The second film layer, including the one layer or each of the two or more layers of the second film layer, can contain one or more additives as described hereinabove for the first film layer. In an embodiment the second film layer, as described hereinabove, can contain one or more other thermoplastic polymers provided that the second film layer maintains its tensile modulus or dimensional change properties or a combination of these properties as described hereinabove.

Adhesive Layer

Referring to FIGS. 1A, 1B, 1C, 1D and 1E the labels 10, 20, 30, 40 and 50 of the present invention comprise an adhesive layer 14. The adhesive layer comprises an adhesive where the adhesive includes an adhesive selected from the group consisting of a natural adhesive, a synthetic adhesive, and a mixture of two or more of any of the foregoing adhesives. Synthetic adhesives include pressure sensitive adhesives. In an embodiment the adhesive of the adhesive layer is a pressure sensitive adhesive. A pressure sensitive adhesive is an adhesive that forms a bond between the adhesive and an adherend, to include for example where the adherend is a polymeric film or a container, with the application of pressure. Pressure sensitive adhesives (PSAs) include acrylic-based PSAs, rubber-based PSAs, and silicone-based PSAs. In an embodiment the adhesive of the adhesive layer is an acrylic-based pressure sensitive adhesive. Pressure sensitive adhesives include emulsion or water-based PSAs, solvent-based PSAs, and solid PSAs which are water-free and solvent-free to include for example hot melt pressure sensitive adhesives. In an embodiment the adhesive of the adhesive layer is an emulsion acrylic-based pressure sensitive adhesive. In several embodiments the adhesive of the adhesive layer, to include for example a pressure sensitive adhesive, has a property selected from the group consisting of a decrease in adhesion strength at elevated temperatures generally above a room or ambient temperature, a decrease in adhesion strength on contact with an aqueous caustic solution such as for example an aqueous caustic soda solution, and a combination of the two foregoing properties. In other embodiments the adhesive of the adhesive layer is used on a dry weight coating basis at 5 to 40 $g/m^2$ (grams per square meter), 8 to 35 $g/m^2$, or 10 to 30 $g/m^2$. Pressure sensitive adhesives are described in Encyclopedia of Polymer Science and Engineering, Vol. 13, Wiley-Interscience Publishers, New York, 1988 and in Polymer Science and Technology, Vol. 1, Interscience Publishers, New York, 1964. Useful adhesives are available from H. B. Fuller Company of Saint Paul, Minn. and Henkel Corporation of Gulph Mills, Pa.

Release Liner/Other Components

Figure 3:
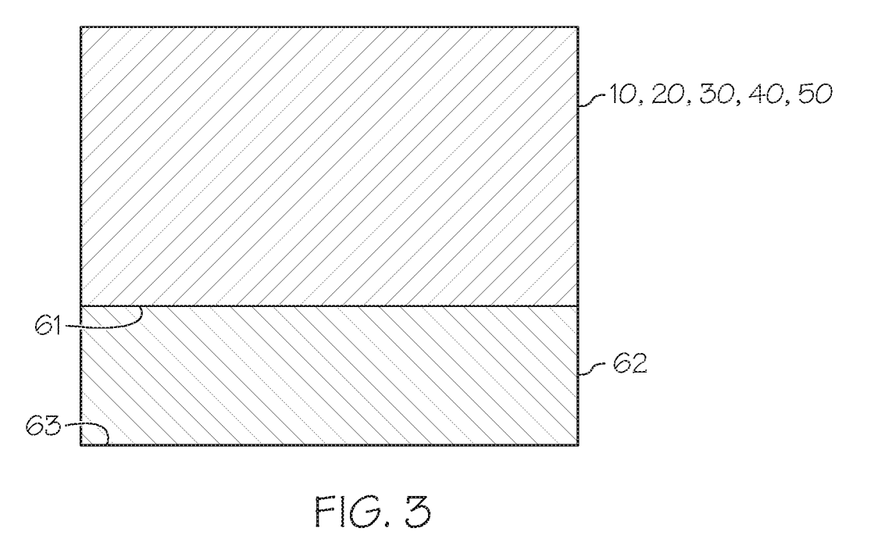
FIG. 3 is a sectional view of a label containing a release liner according to a preferred embodiment.

Referring to FIG. 3 the labels 10, 20, 30, 40 and 50 of the present invention can include a release liner 62. The release liner can be monolayered having only one layer or can be multilayered having two or more layers. The layer or layers of the release liner can include a layer selected from the group consisting of a paper layer to include for example a calendered glassine paper layer, a polymeric layer to include for example a polyolefin-based layer or a poly(ethylene terephthalate)-based layer, and in the case of a multilayered release liner a combination of two or more of any of the foregoing layers. The release liner has a first surface 61 and a second surface 63 and normally includes a release coating on at least the first surface of the release liner. The release coating, to include for example an organosiloxane polymer release coating also known as a silicone release coating, allows the release liner to be releasably attached to the adhesive layer of the label so that the release liner can be removed from the adhesive layer of the label during a labeling process leaving the adhesive layer adhesively joined to the film of the label.

Multilayered films of the label of the present invention can include one or more tie layers and/or one or more lamination adhesive layers. Referring to FIGS. 1D and 1E the labels 40 and 50 can include at least one layer 26 which can be a tie layer or a lamination adhesive layer. When present in the label a tie layer is located between two layers of the film and generally functions to improve adherence between the two layers of the film. Depending on the compositions of the two layers of the film which the tie layer is located between, the tie layer can include at least one thermoplastic polymer selected from the group consisting of a polyolefin to include for example ethylene and propylene homopolymers and copolymers, an unsaturated carboxylic acid or anhydride grafted polyolefin to include for example maleic anhydride grafted polypropylenes and maleic anhydride grafted polyethylenes, an alkene-unsaturated carboxylic acid or unsaturated carboxylate ester copolymer to include for example ethylene-alkyl methacrylate copolymers and ethylene-vinyl acetate copolymers, a metal salt of an alkene-unsaturated carboxylic acid copolymer to include for example ionomers which are sodium or zinc salts of ethylene-methacrylic acid copolymers, a styrene homopolymer or copolymer, a cyclic olefin homopolymer or copolymer, a halogen-containing polymer, a polyurethane, a polycarbonate, a polyacrylonitrile, a polyamide, an aromatic polyether, an aromatic polyimide, an aromatic polyamide-imide, a (meth)acrylate polymer, a polyester to include for example poly(ethylene terephthalate)s, a hydrocarbon resin to include for example hydrogenated polyterpene resins, and a mixture of two or more of any of the foregoing polymers.

The film of the label of the present invention can include one or more coatings, also known as topcoats, on its first and second surfaces to enhance adhesion of a printing ink or an adhesive to the film or to provide protection including for example from abrasion and/or moisture. The coating can be an ink-receptive or adhesive-receptive material to include for example an acrylic primer or an abrasion or moisture resistant material to include for example a polyolefin or polyester where the coating can be applied in a liquid form and dried or allowed to dry.

Label Processing

The film and label of the present invention can be prepared by one or more steps that include steps selected from the group consisting of an extrusion of a single layer, a coextrusion of two or more layers, a lamination of two or more layers, an application of one or more coatings, and a combination of two or more of any of the foregoing steps. The extrusion or coextrusion steps can be done through linear dies or annular dies. In an embodiment the film is monolayered and contains a monolayered first film layer which is formed by an extrusion step. In embodiments the film is multilayered and contains a multilayered first film layer which is formed by a coextrusion step, by a combination of extrusion and lamination steps, or by a combination of extrusion and coextrusion and lamination steps. In other embodiments the film is multilayered and contains a first film layer and a second film layer where the first film layer can be monolayered or multilayered and the second film layer can be monolayered or multilayered. The second film layer can be formed separately from the first film layer or together with the first film layer by one or more steps as described above for the film, label, and the monolayered and multilayered first film layer. In an embodiment a multilayered film contains a two-layered first film layer where each of the two layers is formed by an extrusion step and then the first film layer is formed by a lamination step. The lamination can be done by bringing layers together usually under pressure with or without heat and with or without a lamination adhesive. Lamination adhesives include for example polyurethane based adhesives and acrylic based adhesives such as acrylic based permanent pressure sensitive adhesives. In an embodiment the lamination is done by bringing layers together at a pressure of 69 to 690 KPa (kilopascals) at an ambient temperature of 23° C. with a lamination adhesive, a polyurethane based adhesive, between the layers. In an embodiment a multilayered film contains a monolayered first film layer and a monolayered second film layer where each layer is formed by an extrusion step and then the multilayered film is formed by a lamination step.

In an embodiment, as described hereinabove, the film comprises a first film layer where the first film layer is nonoriented. In an embodiment the film is nonoriented or not stretched. In other embodiments the film comprises a second film layer where the second film layer is oriented or stretched uniaxially in one direction, which can be the machine direction or the transverse direction, or the second film layer is oriented biaxially in two directions which are usually the machine direction and the transverse direction. Orienting or stretching is stretching the second film layer or the second film layers of the film to align the polymer chains of the thermoplastic polymer or polymers, present in the second film layer or layers, in the direction of the stretching. The stretching results in the second film layer or layers having an increase in length and consequently a decrease in thickness. Although the stretching can be done at any temperature, it is usually done at an elevated temperature near the softening temperature of the polymer or polymers. The stretching generally increases the stiffness or tensile modulus (ASTM D882) of the second film layer or layers in the direction of the stretching. In embodiments the second film layer or second film layers of the film can be oriented by stretching it or them uniaxially or biaxially in a stretch ratio range of 2 to 12, 3 to 10, or 4 to 8 where the stretch ratio is the ratio of the film layer length after stretching to the film layer length before stretching. In order to provide dimensional stability to an oriented second film layer or second film layers of the film so it does not or they do not shrink or distort appreciably especially when exposed to elevated temperatures, the oriented second film layer or the oriented second film layers can be annealed or heat set by heating the tensioned second film layer or second film layers near the softening temperature of the constituent polymer or polymers. In embodiments the annealed second film layer has or the annealed second film layers have a linear shrinkage (ASTM D1204) at 100° C. in the machine direction and the transverse direction of less than 5%, less than 4.9%, less than 4.8%, or less than 3%. In an embodiment the film is a monolayered film and has only one layer. In an embodiment the film is a multilayered film and has two or more layers. In embodiments the first film layer is monolayered or is multilayered where the first film layer is or first film layers are nonoriented. In embodiments the film is multilayered and contains a monolayered second film layer which is nonoriented or is oriented or is oriented and annealed. In embodiments the film is multilayered and contains a multilayered second film layer where all the layers of the second film layer are nonoriented, all the layers of the second film layer are oriented or oriented and annealed, or part of the layers of the second film layer are oriented or oriented and annealed where part of the layers of the second film layer includes at least one layer of the second film layer but not all the layers of the second film layer. In embodiments the multilayered film has a first film layer and a second film layer where both the first film layer and second film layer are monolayered, both the first film layer and second film layer are multilayered, the first film layer is monolayered and the second film layer is multilayered, or the first film layer is multilayered and the second film layer is monolayered. In an embodiment, referring to FIGS. 1A, 1B, 1C, 1D and 1E the label has a thickness T which includes the thickness of the first film layer $T_{FFL}$ and the thickness of the adhesive layer $T_{AL}$, or the thickness of the first film layer $T_{FFL}$, the thickness of the second film layer $T_{SFL}$ and the thickness of the adhesive layer $T_{AL}$, or the thickness of the first film layer $T_{FFL}$, the thickness of the second film layer $T_{SFL}$, the thickness of the tie layer $T_{TL}$ or the lamination adhesive layer $T_{LAL}$ and the thickness of the adhesive layer $T_{AL}$. The film has a thickness which is the thickness of the first film layer $T_{FFL}$, or includes the thickness of the first film layer $T_{FFL}$ and the thickness of the second film layer $T_{SFL}$, or includes the thickness of the first film layer $T_{FFL}$, the thickness of the second film layer $T_{SFL}$ and the thickness of the tie layer $T_{TL}$ or the lamination adhesive layer $T_{LAL}$. In embodiments the thickness in micrometers of the film and the first film layer $T_{FFL}$ can range from 5 to 254, 6 to 127, or 7 to 63.5. In embodiments the first film layer, the second film layer, the tie layer and the lamination adhesive layer can each have a thickness, respectively $T_{FFL}$ and $T_{SFL}$ and $T_{TL}$ and $T_{LAL}$, in micrometers ranging from 1.7 to 85, 2 to 42, or 2.3 to 21.

The film can be treated on one surface or both of its surfaces to enhance performance to include abrasion resistance, moisture resistance, and adhesion of an ink or adhesive to a surface or surfaces of the film. Surface treatments include a corona discharge treatment, a flame treatment, a plasma treatment, a topcoat treatment, or combinations of two or more of any of the foregoing treatments. Topcoat treatments include treatment of one or both surfaces of the film with an ink-receptive or adhesive-receptive material such as for example an acrylic primer and/or with a protective varnish. The treatments can be done any time during the manufacture and subsequent processing of the film and label where the time of the treatment generally depends on the performance enhancement. For example a treatment to enhance ink reception would precede a printing step while a topcoating for abrasion resistance might follow a printing step. In an embodiment the first surface or the second surface of the film is surface treated to enhance adhesion of an ink to the film. In an embodiment the second surface of the film is surface treated to enhance adhesion of an adhesive to the film. In an embodiment the first surface of the film is surface treated to enhance abrasion resistance and/or moisture resistance of the film.

In several embodiments the label includes a film, an adhesive layer, and a release liner. The label of the present invention can be prepared in any manner. In an embodiment a film or one or more layers of a film can be slit into widths suitable for subsequent processing steps and labeling operations. In embodiments the film can be coated with an adhesive to form an adhesive layer and then the film and adhesive layer can be combined in a lamination step with a release liner, or a release liner can be coated with an adhesive to form an adhesive layer and then the release liner and adhesive layer can be combined in a lamination step with the film. The label containing a film, adhesive layer and release liner can be further processed to include printing steps and/or die-cutting steps. In an embodiment the label, containing a film and adhesive layer and release liner, can be printed using any printing means and using any printing ink. Printing means include for example offset lithography, flexographic, digital, thermal, inkjet and laser. Printing inks include for example water-based inks, solvent-based inks and UV-activated inks. Alternatively in another embodiment a film or a film layer can be printed prior to eventually combining with an adhesive layer or with an adhesive layer and release liner as described above. In embodiments the film is monolayered or multilayered and has a first outer surface and a second outer surface where the first outer surface of the film has a print layer or the second outer surface of the film has a print layer which can also have an adhesive layer adhesively joined to the print layer. In an embodiment the film is multilayered and has two or more layers where a print layer is located between the layers of the film. In an embodiment the film is multilayered and has a first film layer and a second film layer where either the first film layer or the second film layer is printed and then the first film layer and the second film layer are combined in a lamination step where a print layer is located between the first film layer and second film layer. In an embodiment a label containing a printed or nonprinted film, adhesive layer and release liner is die-cut using any die-cutting means, to include for example a rotary cutting die, where as a result of the die-cutting a die-cut ladder-shaped matrix of the film and adhesive layer is formed that contains a series of individual labels on the release liner which acts as a carrier for the labels. This die-cut series of labels can then be used to label articles in a labeling process where individual labels are successively removed from the release liner and the die-cut ladder-shaped matrix. Processing to include extrusion, coextrusion, orienting, annealing, coating, surface treatments, label construction, printing, die-cutting and labeling of articles is further described in U.S. Pat. No. 7,217,463 to Henderson and U.S. Pat. No. 7,144,542 to Holzer et al.

Label Construction

In an embodiment a label includes a film having an upper or first surface and a lower or second surface and comprising a first film layer, and an adhesive layer having an upper or first surface and a lower or second surface where the first surface of the adhesive layer is adhesively joined to the second surface of the film. In an embodiment a label 10 includes a film comprising a first film layer 12 having a first surface 11 and a second surface 13, and an adhesive layer 14 having a first surface 15 and a second surface 17 where the first surface 15 of the adhesive layer 14 underlies the second surface 13 of the first film layer 12. The term "underlie" and related term "overlie" when referring to a first layer underlying or overlying a second layer mean that the first layer can partially or fully cover the second layer and that the first layer and second layer can be in direct contact with each other or that one or more intermediate layers, to include for example tie layers or lamination adhesive layers, can be located between the first layer and second layer. In an embodiment a label 20 includes a film comprising a first film layer 12 having a first surface 11 and a second surface 13 and a second film layer 22 having a first surface 21 and a second surface 23 and a thickness $T_{SFL}$, and an adhesive layer 14 having a first surface 15 and a second surface 17 and a thickness $T_{AL}$ where the first surface 21 of the second film layer 22 underlies the second surface 13 of the first film layer 12 and the first surface 15 of the adhesive layer 14 underlies the second surface 23 of the second film layer 22. In an embodiment a label 30 includes a film comprising a second film layer 22 having a first surface 21 and a second surface 23 and a thickness $T_{SFL}$ and a first film layer 12 having a first surface 11 and a second surface 13, and an adhesive layer 14 having a first surface 15 and a second surface 17 and a thickness $T_{AL}$ where the first surface 11 of the first film layer 12 underlies the second surface 23 of the second film layer 22 and the first surface 15 of the adhesive layer 14 underlies the second surface 13 of the first film layer 12. In an embodiment a label 40 includes a film comprising a first film layer 12 having a first surface 11 and a second surface 13 and a tie layer or lamination adhesive layer 26 having a first surface 25 and a second surface 27 and a second film layer 22 having a first surface 21 and a second surface 23 and a thickness $T_{SFL}$, and an adhesive layer 14 having a first surface 15 and a second surface 17 and a thickness $T_{AL}$ where the first surface 25 of the tie or lamination adhesive layer 26 underlies the second surface 13 of the first film layer 12 and the first surface 21 of the second film layer 22 underlies the second surface 27 of the tie or lamination adhesive layer 26 and the first surface 15 of the adhesive layer 14 underlies the second surface 23 of the second film layer 22. In an embodiment a label 50 includes a film comprising a second film layer 22 having a first surface 21 and a second surface 23 and a thickness $T_{SFL}$ and a tie layer or lamination adhesive layer 26 having a first surface 25 and a second surface 27 and a first film layer 12 having a first surface 11 and a second surface 13, and an adhesive layer 14 having a first surface 15 and a second surface 17 and a thickness $T_{AL}$ where the first surface 25 of the tie or lamination adhesive layer 26 underlies the second surface 23 of the second film layer 22 and the first surface 11 of the first film layer 12 underlies the second surface 27 of the tie or lamination adhesive layer 26 and the first surface 15 of the adhesive layer 14 underlies the second surface 13 of the first film layer 12. In an embodiment the second film layer, as described hereinabove, has a combination of properties where the layer or layers of the second film layer have a tensile modulus (ASTM D882) in a machine direction of at least 715 MPa, at least 830 MPa, or at least 945 MPa after immersion in water at a temperature of about 80° C. for at least about 3 minutes, and an absolute areal dimensional change (ASTM D1204) of less than 4.9%, less than 4.5%, or less than 4% after immersion in water at a temperature of about 80° C. for at least about 3 minutes. In an embodiment the second film layer 22, having after immersion in water at a temperature of about 80° C. for at least about 3 minutes the combined properties of a tensile modulus (ASTM D882) in a machine direction of at least 715 MPa and an absolute areal dimensional change (ASTM D882) of less than 4.9%, has a thickness $T_{SFL}$ which is greater than the thickness $T_{AL}$ of the adhesive layer 14 and in other embodiments the thickness of the second film layer is at least 5% greater, at least 10% greater, at least 20% greater, at least 30% greater, at least 40% greater, at least 50% greater, or at least 60% greater than the thickness of the adhesive layer. In embodiments the film or label has high clarity visual aesthetics where the film or label is clear having a TAPPI (Technical Association of the Pulp and Paper Industry) T425 opacity of 12% or less, 10% or less, or 8% or less and a haze (ASTM D1003) of 12% or less, 10% or less, or 8% or less. In embodiments the film or label is dispensable during a labeling operation where the film or label has an ISO (International Organization for Standardization) 2493 bending resistance in mN (milliNewtons) of at least 14, at least 16, at least 18, or at least 20. In embodiments a label 10, 20, 30, 40 or 50 includes an adhesive layer 14 having a second surface 17 and a release liner 62 having a first surface 61 and a second surface 63 where the first surface 61 of the release liner 62, which normally includes a release coating, is releasably attached to the second surface 17 of the adhesive layer 14. The label of the present invention can comprise a monolayered or multilayered first film layer and a monolayered or multilayered second film layer where the label can include any type of layer construction regarding the ordering of film layers such as for example alternating first film layers and second film layers.

Label Removability

The labels of the present invention are removable from a container during an industrial washing process when subjected to a warm or hot washing fluid. The washing fluid includes washing liquids such as for example water or an aqueous caustic solution where the temperature of the washing fluid or washing liquid is usually at least 50° C. and typically can range from 50 to 100° C. Aqueous caustic solutions include for example aqueous caustic soda solutions which can be dilute solutions containing 0.5 to 4% by weight sodium hydroxide. In embodiments an aqueous caustic solution can have a pH of at least 4, at least 6, at least 7, or at least 8 where pH is defined as—log (logarithm to the base 10) of the hydrogen ion concentration in the solution. The containers include those described hereinabove such as for example plastic and glass containers which can be used in the beverage industry and are reusable and/or recyclable. In an embodiment the container is a glass beer bottle which is reusable and/or recyclable. In an embodiment a labeled container includes a label, as described throughout the Detailed Description and Drawings and Claims, and a container where (i) the label 10. 20, 30, 40 or 50 is attached to the container 72 having a vertical axis which is parallel to the height of the container and a horizontal axis which is parallel to the circumference of the container where the second surface of the adhesive layer is adhesively joined to an outer surface of the container, (ii) the machine direction or the transverse direction of the first film layer circumferentially follows the horizontal axis of the container, and (iii) the label is removable from the container after immersion in a washing liquid where the temperature of the washing liquid is at least 50° C., greater than 50° C., greater than 55° C., or greater than 60° C. and the label detaches from the container. In embodiments the term "follows" means that the machine direction or the transverse direction of the first film layer that circumferentially follows the horizontal axis of the container can be parallel to the horizontal axis or that the machine or transverse direction can form an angle with the horizontal axis of less than 45° (45 degrees), less than 20°, or less than 10°. In embodiments the container of the above described labeled container can be any shaped container to include a cylindrically shaped container where the vertical axis of the container is parallel to the length of the cylindrically shaped container and the horizontal axis of the container is parallel to the circumference of the cylindrically shaped container. The label of the present invention includes a first film layer, as described hereinabove, which has a significant inherent shrinkage when heated above ambient temperature where the first film layer is nonoriented and has a relatively high two-dimensional change in area which is an areal shrinkage as measured in the machine direction and the transverse direction after immersion in a warm or hot washing fluid. Labels, containing a first film layer or a first film layer and a second film layer, attached to a container and immersed in a warm aqueous washing liquid having a temperature of at least 50° C. or greater than 50° C. curl due to the inherent shrinkage of the first film layer which exposes the adhesive layer of the label to the warm aqueous washing liquid. The adhesive of the adhesive layer is generally selected that has a property selected from the group consisting of a decrease in adhesion strength at elevated temperatures generally above a room or ambient temperature, a decrease in adhesion strength on contact with an aqueous caustic solution such as for example an aqueous caustic soda solution, and a combination of the two foregoing properties so that upon exposure of the adhesive to the washing liquid, the label is able to detach from the container. In an embodiment the label of the present invention includes a film comprising a first film layer having a first surface and a second surface and a second film layer having a first surface and a second surface, and an adhesive layer having a first surface and a second surface where the first surface of a layer of the second film layer underlies the second surface of a layer of the first film layer, the first surface of the adhesive layer is adhesively joined to the second surface of a layer of the second film layer, and the second film layer, as described hereinabove, compared to the first film layer, after immersion in water at a temperature of about 80° C., has a higher loss in tensile modulus in a machine direction or a lower areal dimensional change or a combination of the two foregoing properties. In embodiments a label, as described throughout the Detailed Description and Drawings and Claims, becomes detached and removed from a cylindrical glass container within 3 minutes after immersion of the container and the attached label in a washing liquid where the temperature of the washing liquid is at least 50° C., greater than 50° C., greater than 55° C., or greater than 60° C.

Film and Label Examples

The following nonlimiting film examples and label examples further describe and illustrate the present invention.

Table I lists film examples that were used in subsequent label examples and also provides the source and physical properties of the films.

TABLE I

| Film Example No. | Resin Identity[1] | $Tg^2$, ° C. | Modulus[3], MPa | | Areal Dimensional Change[4], % |
|---|---|---|---|---|---|
| | | | Ambient | 80° C. Wet | |
| 1 | COC | 65 | 2410 | 1450 | 13.2 |
| 2 | PMMA | 98 | 1680 | 1290 | 1.4 |
| 3 | PC | 145 | 1980 | 1810 | 0.4 |
| 4 | PA | 75 | 2660 | 600 | 5.4 |
| 5 | EVOH-32% | 69 | 2900 | 110 | 8.7 |

[1]Film Example 1 was a 50.8 micrometer thick cyclic olefin copolymer (COC) monolayered film prepared by extrusion without orientation using TOPAS Advanced Polymers ethylene-norbornene based cyclic olefin copolymer resin TOPAS ™ 9506.

Film Example 2 was a 50.8 micrometer thick poly(methyl methacrylate) (PMMA) monolayered film prepared by extrusion without orientation using impact modifier containing poly(methyl methacrylate) resin PSR-9 manufactured by Arkema Inc.

Film Example 3 was a 25.4 micrometer thick polycarbonate (PC) monolayered film prepared by extrusion without orientation using Mitsubishi bisphenol A based polycarbonate resin E2000.

Film Example 4 was a 58.4 micrometer thick aromatic polyamide (PA) monolayered film prepared by extrusion without orientation using an aromatic polyamide MXD6 resin from Mitsubishi Gas Chemical American which was derived from meta-xylylenediamine.

Film Example 5 was a 50 micrometer thick ethylene-vinyl alcohol copolymer monolayered film prepared by extrusion without orientation using an ethylene-vinyl alcohol copolymer EVAL ® resin from EVAL Americas which had a 32 mole % ethylene content (EVOH-32%).

[2]Tg is the glass transition temperature for each of the polymeric resins.

[3]Tensile modulus (ASTM D882) for each film example was measured in the machine direction at ambient room temperature of 23° C. and after immersion of the film in water at a temperature of about 80° C. for at least about 3 minutes.

[4]Areal dimensional change in the machine and transverse directions was measured for each film example using ASTM D1204 test procedure after immersion of the film in water at a temperature of about 80° C. for at least about 3 minutes. Film Examples 1-4 had a decrease in area while Film Example 5 had an increase in area.

Table II lists label examples and includes label constructions and results for removability from a container.

TABLE II

| Label Example No. | Label Construction[1] | Removability[2], Seconds | |
|---|---|---|---|
| | | Ambient | Heated |
| 1 | COC/PSA | 60 | >180 |
| 2 | PMMA/PSA | 25 | >180 |
| 3 | PC/PSA | 85 | 103 |
| 4 | PA/PSA | 13 | 41 |
| 5 | EVOH-32%/PSA | >180 | 44 |
| 6 | COC/LA/PMMA/PSA | 2 | 35 |
| 7 | COC/LA/PC/PSA | 137 | 81 |

TABLE II-continued

| Label Example No. | Label Construction[1] | Removability[2], Seconds | |
|---|---|---|---|
| | | Ambient | Heated |
| 8 | COC/LA/PA/PSA | 106 | 137 |
| 9 | COC/LA/EVOH-32%/PSA | >180 | 102 |

[1]Label Examples 1-9 of Table II were prepared from the corresponding Film Examples 1-5 of Table I except that while Label Example 1 used a 50.8 micrometer thick COC film, Label Examples 6-9 used a 25.4 micrometer thick COC film. Each label example was 76.2 mm (millimeters) high and 50.8 mm wide where the label width was the machine direction of the film or film layers. Each label example was coated with a pressure sensitive adhesive (PSA) at 15 grams per square meter on a dry weight basis. Label Examples 6-9 were prepared by laminating the corresponding film examples together with a lamination adhesive (LA) then applying the pressure sensitive adhesive to respectively the PMMA, PC, PA, and EVOH-32% side of the laminate.
[2]Label Examples 1-9 were applied to glass bottles having a circumference of 191 mm. The labels were applied to the bottles with the PSA layer in contact with the outer surface of the bottle where the label width followed the circumference or horizontal axis of the bottle. After the bottles were labeled they were stored for 7 days at an ambient temperature of 20-23° C. to simulate an ambient storage or for 2 days at 60° C. followed by 1 day at an ambient temperature of 20-23° C. to simulate a heated storage. After ambient or heated storage, label removability was evaluated by initially immersing the bottles for 1 minute in a 50° C. water bath that simulated a rinsing step and then immersing the rinsed bottles in a water bath at a temperature of about 80° C., that simulated a washing step, and measuring the time in seconds until the label detached from the bottle in a water bath at a temperature of about 80° C. or until 180 seconds had elapsed.

Each of the documents referred to in the Detailed Description is incorporated herein by reference. All numerical quantities in this application used in the Summary of the Invention, Detailed Description and appended Claims are understood to be modified by the word "about" except in the examples or where explicitly indicated otherwise. All range and ratio limits in the Summary of the Invention, Detailed Description and appended Claims are understood to be combinable.

While the invention has been presented in the Detailed Description and appended Claims, it is understood that various modifications of this invention will become apparent to those skilled in the art upon reading this application. Therefore these various modifications, that fall within the scope of the appended Claims and/or Detailed Description, are considered to be a part of this invention.

What is claimed is:

1. A label, comprising:
   (a) a first film layer having a first surface and a second surface, the first film layer comprising at least one thermoplastic polymer;
   (b) a second film layer having a first surface and a second surface, the second film layer comprising at least one thermoplastic polymer wherein the first surface of the second film layer underlies the second surface of the first film layer;
   (c) an adhesive layer having a first surface and a second surface, wherein the first surface of the adhesive layer is adhered to the second surface of the second film layer, the second film layer being in an attached state when the second surface of the adhesive layer is adhered to an outer surface of a container, the adhesive layer having an adhesion force between the second surface of the adhesive layer and the outer surface of the container;
   wherein the second film layer in the attached state exhibits a detaching force that is greater than the adhesion force when the container is immersed in a washing fluid having a temperature of about 80° C. for a period of about 3 minutes;
   wherein the adhesive layer exhibits at least one of a decrease in adhesion strength at temperatures above a room or ambient temperature and a decrease in adhesion strength on contact with an aqueous caustic solution, and a combination of the two foregoing properties;
   wherein when compared to the second film layer the first film layer exhibits at least one of (i) a higher loss in tensile modulus in a machine direction, (ii) a lower areal dimensional change, and (iii) a combination of the two foregoing properties after immersion in water at a temperature of about 80° C.;
   wherein the first film layer and the second film layer are nonoriented, and
   wherein the first film layer comprises a polymer selected from the group consisting of a cyclic olefin homopolymer, a cyclic olefin copolymer, and a mixture of two or more of any of the foregoing polymers.

2. The label of claim 1 wherein the second film layer has a property selected from at least one of
   (i) a tensile modulus as measured according to ASTM D882 in a machine direction after heating which is less than the tensile modulus in the machine direction in the ambient air;
   (ii) an absolute areal dimensional change as measured according to ASTM D1204 of less than about 05.3% after immersion in water having a temperature of around 80° C. for a period of about 3 minutes;
   and a combination of the two foregoing properties.

3. The label of claim 1 wherein the first film layer has a property selected from at least one of
   (i) a tensile modulus as measured according to ASTM D882 in the machine direction after immersion in water at a temperature of about 80° C. for at least 3 minutes which is at least 40% of the tensile modulus in the machine direction in ambient air,
   (ii) an areal shrinkage as measured according to ASTM D1204 of at least about 5.3% after immersion in water at a temperature of about 80° C. for at least about 3 minutes, and a combination of c(i) and c(ii).

4. The label of claim 3 wherein the second film layer comprises one or more sublayers wherein each of the one or more sublayers of the second film layer comprises at least one thermoplastic polymer, and each of the one or more sublayers of the second film layer has (i) a tensile modulus as measured according to ASTM D882 in the machine direction after immersion in water at a temperature of about 80° C. for at least 3 minutes which is less than 40% of the tensile modulus in the machine direction in ambient air; or (ii) an areal shrinkage as measured according to ASTM D1204 of less than 5.3% after immersion in water at a temperature of about 80° C. for at least about 3 minutes; or a combination of (i) and (ii).

5. The label of claim 1 wherein the at least one thermoplastic polymer of the second film layer comprises a polymer selected from the group consisting of a polyolefin, a (meth)acrylate polymer, a styrene polymer, a polyester, a halogen-containing polymer, a polycarbonate, a polyacrylonitrile, an aromatic polyether, an aromatic polyimide, an aromatic polyamide-imide, an olefin-vinyl alcohol copolymer, a polyamide, and a mixture of two or more of any of the foregoing polymers.

6. The label of claim 1 wherein the first film layer comprises a cyclic olefin copolymer derived from at least one cyclic olefin monomer and at least one alpha-olefin monomer.

7. The label of claim 1 wherein the first film layer comprises a cyclic olefin copolymer.

8. The label of claim 7, wherein the cyclic olefin copolymer is an ethylene-norbornene copolymer.

9. The label of claim 1 wherein the first film layer comprises the cyclic olefin homopolymer and the cyclic olefin copolymer.

10. The label of claim 9, wherein the cyclic olefin copolymer is an ethylene-norbornene copolymer.

11. The label of claim 1 wherein the first layer consists of:
an ethylene-norbornene copolymer;
optionally a cyclic olefin homopolymer; and
optionally at least one additive selected from the group consisting of nucleating agents, antiblocking agents, processing aids, slip agents, antistatic agents, pigments, cavitating agents, inorganic fillers, heat stabilizers, antioxidants, flame retardants, acid acceptors, visible light stabilizers, and ultraviolet light stabilizers.

12. The label of claim 1 wherein the second film layer comprises a polymer selected from the group consisting of a (meth)acrylate polymer, a styrene polymer, a polyester, a halogen-containing polymer, a polycarbonate, a polyacrylonitrile, an aromatic polyether, an aromatic polyimide, an aromatic polyamide-imide, an olefin-vinyl alcohol copolymer, a polyamide, and a mixture of two or more of any of the foregoing polymers.

13. The label of claim 1 wherein the adhesive is a pressure sensitive adhesive.

14. The label of claim 1 wherein the adhesive is directly adhered to the second surface of the second film layer.

15. The label of claim 1 wherein the label has an opacity of 12% or less.

* * * * *